T. M. BRINTNALL.
BANK VAULT FLOORING.
APPLICATION FILED JUNE 18, 1918.
1,369,960.
Patented Mar. 1, 1921.
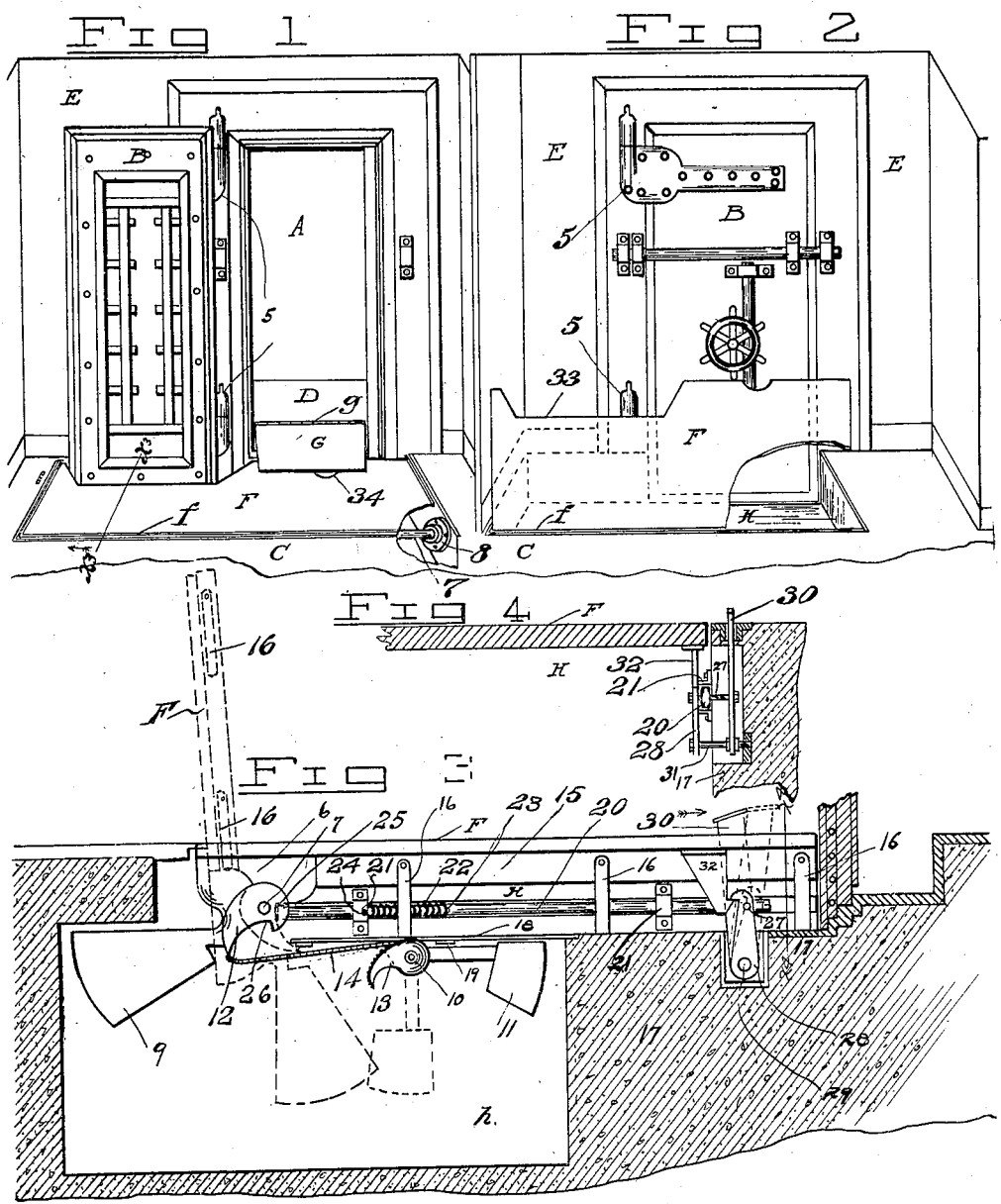

UNITED STATES PATENT OFFICE.

THOMAS M. BRINTNALL, OF OAKLAND, CALIFORNIA, ASSIGNOR OF ONE-HALF TO WILLIAM H. BRINTNALL, OF LOS ANGELES, CALIFORNIA.

BANK-VAULT FLOORING.

1,369,960. Specification of Letters Patent. Patented Mar. 1, 1921.

Application filed June 18, 1918. Serial No. 240,579.

*To all whom it may concern:*

Be it known that I, THOMAS M. BRINTNALL, a citizen of the United States, residing at Oakland, in the county of Alameda and State of California, have invented new and useful Improvements in Bank-Vault Floorings, of which the following is a specification.

This invention relates to bank vault floorings and more particularly to means whereby a level flooring communication between the interior of the vault and the main flooring of the vault room may be maintained, in accommodation of the swinging vault door. In a patent previously issued to me, I have disclosed and claimed a certain species of this genus, and quite broadly claimed the general aspects of such genus, such patent being No. 1,180,106, of April 18, 1916.

In the present case, I provide entirely different means and elements for flooring of the same general purpose, and the parts operate in accordance with a different specified mode of operation. In the prior case, the flooring member is mounted to move vertically into and out of position of service. In the present case, I provide a swinging flooring member, and in combination with this member utilize a further auxiliary flooring member which plays vertically, and is hinged in said vault proper, and swings downwardly onto the main hinged flooring member, when the latter is in position of service. I likewise provide suitable counterweights coöperating with the main flooring member, locking means for maintaining the main flooring member in position of service, and releasing means for said locking means.

The invention has for its object the provision of improved means or mechanism of the character mentioned, which will be generally superior in relative simplicity and inexpensiveness of construction and organization, taken in conjunction with positiveness and reliability in service, convenience and simplicity in control, freedom from liability to get out of order, compactness in form and neatness in appearance, and which will be generally superior in efficiency and serviceability.

With the above and other objects in view, the invention consists in the novel and useful provision, formation, combination, association, arrangement, mode of application and method of use and mode of operation, and inter-relation of parts and features, all as hereinafter described, shown in the drawing, and finally pointed out in claims.

Figure 1 is a perspective view of a bank vault with the vault door in open position, the main flooring member and auxiliary flooring member of the invention being disclosed as located in positions for service.

Fig. 2 is a view similar to Fig. 1, the bank vault door, however, being shown in closed position, the auxiliary flooring member having been withdrawn within the vault, and the main flooring member being swung up or elevated upon its hinges, so as to permit the movement of the door to its illustrated closed position;

Fig. 3 is a vertical section taken in the zone indicated by the line $x^3-x^3$, Fig. 1, and looking in the direction indicated by the adjacent arrow; and Fig. 4 is a vertical section, taken at right angles to the plane of section in Fig. 3, upon the line $x^4-x^4$, Fig. 3, and looking in the direction of the appended arrow.

Corresponding parts in all the figures are designated by the same reference characters.

Referring with particularity to the drawing, A designates the vault opening or entrance of a bank vault, of which B is the vault door, such door being hinged as at 5 to swing in a horizontal plane so as to open up or close the vault entrance or opening A. C designates the main flooring of the vault room, which is approximately at the same level or in the same horizontal plane with the floor D of the vault. E designates generally the outer wall of the vault toward which the vision is directed in Figs. 1 and 2. F designates the main flooring member which is utilized as between the vault room flooring C and the vault flooring D, and which is mounted to swing in a vertical plane, at a hinged line $f$. G designates an auxiliary flooring member which is utilized in conjunction with the main flooring member F, the same being adapted to swing in a vertical plane and being mounted in connection with the vault flooring D at a hinged line $g$. H designates a pit or depression in the main flooring C, in which pit or depression the door B is accommodated in its swinging movements, the sharply beveled formation common to vault doors, to produce and secure overlap between the edge of the door and the vault entrance, requiring the door to extend below the main level of the flooring and thus necessitating such pit. The flooring member F is directly fixed to rocker arms 6 mounted upon a rock shaft 7 mounted in bearings 8 at the extreme sides of the pit H, at the hinge line f. The member F is adapted to swing into the dotted line position shown in Fig. 3. Mounted upon the rock shaft are counter-weights or an extended counter-weight 9, the office of which is to substantially counterbalance the flooring member F. When the flooring member swings upwardly into the position shown in dotted lines in Fig. 3, the counter-weight 9 swings downwardly into the dotted line position shown in Fig. 3. Parallel with the shaft 7, within the pit H, or within the downward extension h of such pit, is another rock shaft 10 carrying an extended counter-weight or counter-weights 11 which coöperate with the counter-weight or counter-weights 9, swinging in opposition to such counter-weight or counter-weights 9. This inter-relation is produced by means of cam-shaped dogs 12 and 13 respectively, mounted upon the shafts 7 and 10, and inter-connected by means of sprocket chains 14, such dogs 12 and 13 having sprocket teeth to coöperate with such sprocket chains. Thus, the counter-weights 9 and 11 act in a single system, and by so subdividing the counter-weight element I am enabled to obtain the same counter-weight efficiency as though the counter-weight element were entirely upon the shaft 7, and also diminish the depth of the pit H within which these counter-weights 9 and 11 play.

Beneath the flooring member F and extending at right angles to the rock shaft 7, is a flooring beam 15 with which are connected pivoted legs 16 which descend onto the flooring 17 of the pit H, and serve to support the flooring when in depressed position. Certain of the legs 16 descend upon a false flooring member 18 which extends transversely of the pit extension h, being supported by means of flooring beams 19 or the like, and which covers up the rock shaft 10 and its connected parts and the sprocket chain 14, such false flooring extending over the pit extension h approximately to the rock shaft 7. A latch bar 20 is mounted at one side wall of the pit H, by means of keepers 21, such latch bar being urged by a contractile spring 22 toward one of the rocker arms 6, such contractile spring surrounding the latch bar 20 and being pinned to it as at 23 at one end and to one of the keepers 21 as at 24 at the other end. The working end 25 of such latch bar coöperates with a face 26 on one of the dogs 12, acting to hold such dog in the position shown in Fig. 3 and lock the rock shaft 7 so as to hold the flooring member F in the elevated position shown in dotted lines in Fig. 3. This latch bar is connected at its flooring end, as by a pin 27, with a pivoted catch 28 mounted in the pit flooring 17, as at 29, and also by the same pin connected with a trip lever 30 pivotally mounted upon a shaft 31 which likewise carries the pivoted catch 28. The catch 28 coöperates with a locking head 32 attached to the flooring member F. When the trip member 30 is moved in the direction of the adjacent arrow in Fig. 3, it carries with it by means of the pin 27 the locking bar 20, and also the pivoted catch 28, releasing such catch from the locking head 32, and permitting the flooring member F to rise. When the flooring member F has risen into the position shown in dotted lines in Fig. 3, the face 26 is in position whereupon, the spring 22 is permitted to act, the trip member 30 being released, so that the locking rod 20 is brought to bear at its working end 25 upon such face 26. It will be understood that the trip member 30 is operated to operate the catch member 28 and the rod 20, in the manner above specified, in opposition to the tension of the spring 22. Such locking rod 20 with its said spring, and such catch member and locking head 32 and trip member 30 constitute locking and releasing means for the flooring member F, to lock such floor member in depressed position and release it from such position; and the working end 25 of the locking bar 20 and the face 26 constituting locking and releasing means for holding the flooring member F in elevated position, and releasing it from such position. In order to so release the flooring member F from elevated position, the trip member 30 is again forced in the direction shown by the arrow in Fig. 3, releasing the face 26 from the working end 25 of the locking bar. The door, responsive to a slight pressure, will then swing downwardly, being nicely counter-balanced, and will lock itself in depressed position, the locking head 32 engaging with the latch 28.

It will be understood that the door can be freely swung either into open or closed position when the flooring member F is in raised position, and after the door has been either opened or closed the flooring member F is lowered to seal the pit and provide a flooring extension over the pit level with the main flooring C. The flooring member F is cut away as at 33 to receive the door when in opened position, as shown in Fig. 1. When the door is thus in opened position, and the flooring member F is down, the auxiliary flooring member G may be swung down from within the vault onto the flooring member F to cover the uneven vault opening formation, and provide a substantially flush level flooring construction from the flooring C over the flooring member F and the flooring member G to the vault flooring D. The flooring member F may be slightly cut away so that the end may readily engage the flooring member G, as shown at 34.

It will be seen that the legs 16 swing into position parallel with the edges of the flooring member F when the latter is raised.

The operation and method of use and advantages of the invention will be readily understood from a consideration of the specific embodiment thereof disclosed in the drawing and herein previously described, without any further specific recitation. It will be obvious that books, money and other valuables could readily be wheeled into and out of this vault when the door is open, over the pit H, by the use of the present invention, and the flooring members G and F are readily and conveniently operated and controlled with a minimum of labor to provide the flooring extensions and formations incident to the use of the invention.

It is manifest that many variations and modifications and changes may be made in adapting the invention to varying conditions of use and service, in departure from the specific construction and organization herein disclosed and described, and shown in the drawing, without departing from the true spirit of the invention and a fair interpretation thereof.

Having thus disclosed my invention, I claim and desire to secure by Letters Patent:

1. A flooring member adapted to be used in conjunction with a bank vault or the like having a swinging door, such flooring being mounted to swing upward and away from the vault door and to cover the pit in which the door swings; a rock shaft upon which such flooring member is mounted to so swing, and locking and releasing means for holding the floor in depressed position and freeing it from such position; said locking and releasing means comprising a locking head upon the flooring member, a catch coöperating with said locking head, and trip means for operating said catch; means being provided tending to maintain said catch and locking head in co-engagement, said means including a locking bar operatively connected with said catch adapted to lock the flooring member in elevated position, and spring means tending to urge the bar into locking position and hold the catch and locking head in co-engagement.

2. A flooring member adapted to be used in conjunction with a bank vault or the like having a swinging door, such flooring being mounted to swing upward and away from the vault door and to cover the pit in which the door swings; a rock shaft upon which such flooring member is mounted to so swing, and locking and releasing means for holding the floor in depressed position and freeing it from such position; said locking and releasing means comprising a locking head upon the flooring member, a catch coöperating with said locking head, and trip means for operating said catch; means being provided tending to maintain said catch and locking head in co-engagement; said last named means comprising a locking bar directly connected with said catch which coöperates with said rock shaft, there being locking and releasing means for maintaining said flooring member in raised position and freeing such flooring member from raised position, and which locking and releasing means include said locking bar and a member operatively connected with said rock shaft.

3. A flooring member adapted to be used in conjunction with a bank vault or the like having a swinging door, such flooring being mounted to swing upward and away from the vault door and to cover the pit in which the door swings, means upon which such flooring member is mounted to so swing, means to lock the flooring member in depressed position, means to lock the flooring member in elevated position operatively and directly connected with and tending to hold the first locking means in locked position, and means to release the first named locking means.

4. A flooring member adapted to be used in conjunction with a bank vault or the like having a swinging door, such flooring being mounted to swing upward and away from the vault door and to cover the pit in which the door swings, means upon which such flooring member is mounted to so swing, means to lock the flooring member in depressed position, means to lock the flooring member in elevated position operatively and directly connected with and tending to hold the first locking means in locked position, means to release the first named locking means, and means for automatically elevating said flooring member when the first named locking means is released.

In testimony whereof, I have signed my name to this specification in the presence of two subscribing witnesses.

THOMAS M. BRINTNALL.

Witnesses:
WM. H. KRONING,
A. C. LOOSE.